United States Patent
Noha et al.

(10) Patent No.: US 7,284,142 B2
(45) Date of Patent: Oct. 16, 2007

(54) REAL TIME INTERRUPT MODULE FOR OPERATING SYSTEMS AND TIME TRIGGERED APPLICATIONS

(75) Inventors: Frank Noha, Sugarland, TX (US); Neomi Fernandez, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 546 days.

(21) Appl. No.: 10/913,964

(22) Filed: Aug. 6, 2004

(65) Prior Publication Data

US 2005/0086406 A1 Apr. 21, 2005

(30) Foreign Application Priority Data

Aug. 8, 2003 (DE) ................... 103 36 585

(51) Int. Cl.
*G06F 1/04* (2006.01)
*G06F 1/14* (2006.01)
(52) U.S. Cl. ...................................... 713/502
(58) Field of Classification Search ................. 713/502
See application file for complete search history.

(56) References Cited

U.S. PATENT DOCUMENTS 4,708,491 A * 11/1987 Luitje ........................ 368/156
4,903,251 A * 2/1990 Chapman .................... 368/156
5,708,817 A 1/1998 Ng et al.
5,982,842 A * 11/1999 Ohtsuka et al. ............... 377/20

OTHER PUBLICATIONS

Messmer, Hans-Peter; *PC-Hardwarebuch, Aufbau, Funktionsweise, Programmierung Ein Handbuch Nicht Nur Fur Profis*, 5.Auflage, no English translation, 15 pgs.

* cited by examiner

*Primary Examiner*—James K. Trujillo
*Assistant Examiner*—Eric Chang
(74) *Attorney, Agent, or Firm*—Robert D. Marshall, Jr.; W. James Brady; Frederick J. Telecky, Jr.

(57) ABSTRACT

An interrupt timer module comprises a prescale counter (PSC) incremented by a real-time interrupt clock signal (RTICLK), a prescale compare value register (CVR) storing a configurable value (PCV), a comparator comparing the current count of the prescale counter (PSC) with the stored configurable value (PCV), a free running counter (FRC) incremented by a match from the comparator, and a plurality of interrupt generation units (IGU0, IGU1, IGU2) Each interrupt generation unit (IGU0, IGU1, IGU2) comprises a compare value register (CVR0, CVR1, CVR2) storing a compare value and a comparator comparing the compare value from the respective compare value register with the current count of the free running counter providing one or both of an interrupt signal (INT0, INT1, INT2) and a direct memory request signal (DMAREQ0, DMAREQ1, DMAREQ2) upon a match.

17 Claims, 3 Drawing Sheets

REAL TIME INTERRUPT MODULE FOR OPERATING SYSTEMS AND TIME TRIGGERED APPLICATIONS

TECHNICAL FIELD OF THE INVENTION

The technical field of this invention is a timer module for generating interrupts to a system that provides a real-time interrupt.

BACKGROUND OF THE INVENTION

In a system equipped with a microcontroller that provides a real-time interrupt (RTI), interrupts can be generated periodically or based on compare values, independently of the software loop or the CPU state. The primary function of the RTI is to provide a programmable clock period, separate from the system clock domain. Thus, the RTI can be used to provide periodic interrupts for an operating system. It can also be used for measuring elapsed time within an application or measuring time intervals for benchmarking code.

In an environment where a communication controller provides a global time to all nodes connected to a bus (e.g. TTCAN, TTP/C, FlexRay), time triggered applications need to be synchronized to this global time. However, in the event that the global time fails due to a problem on the bus, the application should continue without affecting the flow of operation.

In such an environment, operating systems require different time bases with different resolutions, ranging from a few hundred nanoseconds to hours. Conventionally, big counters of greater than 64 bits must be used to cover the entire range with a high frequency clock, which is needed for short timebases. Another requirement for some applications running in such an environment, e.g. safety-relevant automotive control applications, is to know exactly when certain peripheral events occurred.

SUMMARY OF THE INVENTION

The present invention provides a timer module particularly adapted for these requirements without the need to implement big counters.

Specifically, in a first aspect of the invention, a timer module is provided for generating interrupts to a system including a microcontroller that provides a real-time interrupt using a dedicated real-time interrupt clock signal. The timer module comprises a prescale counter incremented by the real-time interrupt clock signal, a prescale compare value register for storing a configurable value, a comparator for comparing the current count of the prescale counter with the stored configurable value, and a free running counter incremented by a match from the comparator. A plurality of interrupt generation units each have an input receiving the current count of the free running counter. Each of the interrupt generation units comprises a compare value register for storing a compare value, and a comparator for comparing the compare value from the respective compare value register with the current count of the free running counter and for providing an interrupt signal when the current count matches the compare value. Since the free running counter is cascaded with the prescale counter and the interrupt generation units each use a configurable compare value, interrupts may be generated within a large range of timebases even with just two counters of a moderate size, e.g. 32 bit counters.

In a second aspect of the invention, a dual timer module is provided for generating interrupts to a system including a microcontroller that provides a real-time interrupt using a dedicated real-time interrupt clock signal. The dual timer module comprises two counter blocks. Each counter block includes a prescale counter incremented by the real-time interrupt clock signal, a prescale compare value register for storing a configurable value, a comparator for comparing the current count of the prescale counter with the stored configurable value and a free running counter incremented by a match from the comparator. The dual timer module further has a plurality of interrupt generation units each having an input, and a multiplexer selectively connecting the inputs of the interrupt generation units with the count output of the first or second free running counter. Each interrupt generation unit includes a compare value register for storing a compare value and a comparator for comparing the compare value from the respective compare value register with the current count of a selected one of the free running counters and for providing an interrupt signal when the current count matches the compare value. The two counter blocks work independently of each other and can be configured to provide different time resolutions. In each counter block, the free running counter is cascaded with the prescale counter. The interrupt generation units each use a configurable compare value. As a result, even if two counters of a moderate size, e.g. 32 bit counters, are used in each counter block, interrupts may be generated within a large range of timebases at different resolutions in time.

In preferred embodiments, the prescale counter is an up counter combined with a compare register. The free running counter is also an up counter and is incremented each time the prescale counter reaches the compare value. The implementation with up counters greatly facilitates the determination of the local time since this determination only involves reading both counter values of the cascaded counters, avoiding a calculation in software to determine the number of clock cycles as would be required with down counters.

The compare registers in the interrupt generation units can be configured individually for the two counter blocks. For operating systems that require periodic time intervals, preferred embodiments provide an automatic update feature of the compare register contents. At each compare match, an update value stored in an update compare register is added to the compare value in the compare register. The value stored in the update compare register determines the time interval until the next interrupt is generated.

In a further development of the invention, at least one counter block is selectively driven either by an internal clock, the real-time interrupt clock signal or by an external clock, e.g. provided by a communication controller, as required by certain time triggered applications. The external clock is supervised by checking whether the external clock arrives within a timing window which is defined by a lower limit stored in a timebase low compare value register and an upper limit stored in a timebase high compare value register. When the value of the prescale counter leaves the predetermined timing window before the external clock is detected, this indicates that the external clock has failed, and incrementation of the free running counter in the counter block is switched from external to internal. To minimize the jitter introduced into the operating system upon switching to the internal clock, the external and internal clocks should be synchronized. Synchronization between the external and internal clocks can be done by software.

In further preferred embodiments, timestamp functionality is implemented by associating a capture register with each of the counters to capture the respective current counts in response to an external event. Since the counters are implemented as up counters, it is easy to determine a local time from the counts stored in the capture registers.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
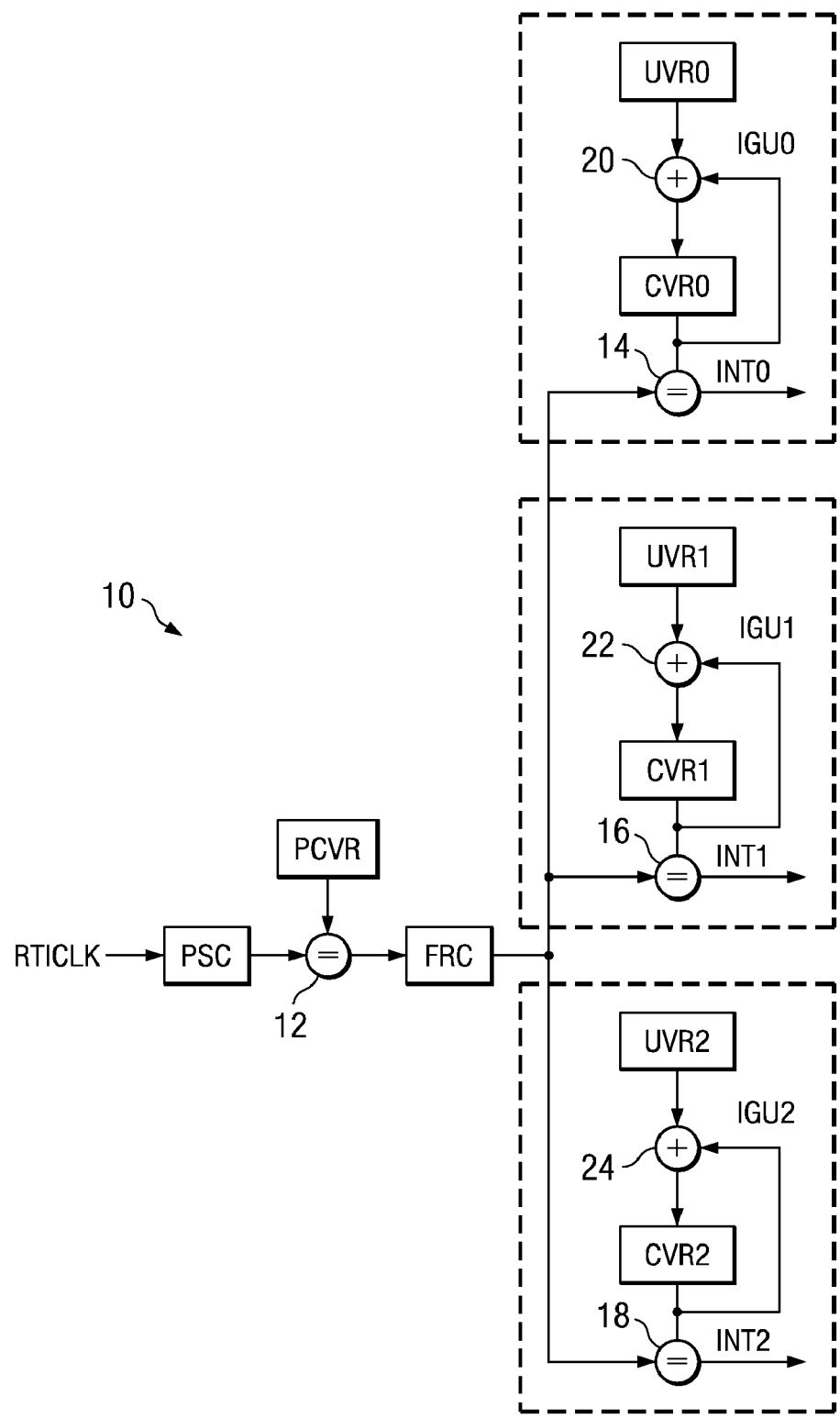
FIG. 1 shows a schematic of a timer module according to a first embodiment of the invention.

FIG. 1 illustrates a schematic of a timer module 10 for generating interrupts INT0, INT1 and INT2 to a system that includes a microcontroller (not shown). Timer module 10 includes: a prescale counter PSC which is incremented by a real-time interrupt clock signal RTICLK provided by the system; a comparator 12, which compares the current count of the prescale counter PCS with a configurable compare value stored in a prescale compare value register PCVR; and a free running counter FRC, which is incremented by the comparator 12 when the current count of the prescale counter PSC matches the configurable compare value. When this match occurs, the prescale counter PSC is reset to zero.

Timer module 10 further includes three interrupt generation units IGU0, IGU1 and IGU2, each of which has an input connected to the output of the free running counter FRC. Each of these interrupt generation units includes: a compare value register CVR0, CVR1, CVR2 for storing a compare value; and a comparator 14, 16, 18, for comparing the current count of the free running counter FRC with the compare value from the respective compare value register CVR0, CVR1, CVR2. Each of these interrupt generation units IGU0, IGU1, IGU2 further includes: an update value register UVR0, UVR1 and UVR2, for storing a respective update value; and an adder 20, 22, 24, for adding the respective update value to the compare value register CVR0, CVR1 or CVR2.

The function of the interrupt generation units IGU0, IGU1 and IGU2 is now explained with reference to the first interrupt generation unit IGU0.

When the current count of the free running counter FRC matches the value of the compare value register CVR0, comparator 14 generates an interrupt signal INT0. Then the update value stored in the update value register UVR0 is added to the compare value via adder 20. This automatic update of the update value register UVR0 allows the interrupt generation unit IGU0 to provide a periodical interrupt INT0. The period for the interrupt signal INT0 is easily configured by programming the update value in the update value register UVR0. This avoids any requirement of software calculation of the next compare value. Further, the interrupt INT0 can quickly be enabled or disabled.

In a similar way, the other interrupts INT1 and INT2 are generated by the respective interrupt generation units IGU1 and IGU2.

The configurable count value stored in the prescale compare value register PCVR allows programming of the prescale counter PSC, i.e. programming of a ratio between the interrupt clock signal RTICLK and an intermediate clock by which the free running counter FRC is incremented. This allows the timer module to be easily configured, e.g. for use in different systems with different clock signals.

Timer module 10 can achieve a very large range of periods for the interrupt signals INT0, INT1 and INT2 with no need for big counters (e.g. greater than 64 bits), due to the cascaded prescale counter PSC and the free running counter FRC. A range in periods from some nanoseconds to hours or days can be implemented with 32 bit counters. The minimal time resolution depends on the frequency of the interrupt clock signal RTICLK, which can be typically up to 400 MHz or more. This allows the clock signal to be derived from the system clock or the VBUS, selectable in the system.

The three interrupt generation units IGU0, IGU1 and IGU2 allow the timer module 10 to provide three independent interrupt signals INT0, INT1 and INT2 with different and which easily configured periods. Of course, three interrupt generation units is only exemplary and any suitable number can be used.

The local time can be determined by reading the values of the prescale counter PSC and the free running counter FRC. The free running counter has to be read first. This will ensure that at the CPU read cycle, the value of the prescale counter PSC is stored in a counter register. The second read is done on prescale counter register PSC, which holds then the value of the counter cycle of the previous read on the register of the free running counter FRC. This sequence ensures that the value from both counters corresponds to exactly the same moment in time. Since both the prescale counter PSC and the free running counter FRC are up counters, no software calculation is required to get the actual time, as would be required when using down counters.

Figure 2:
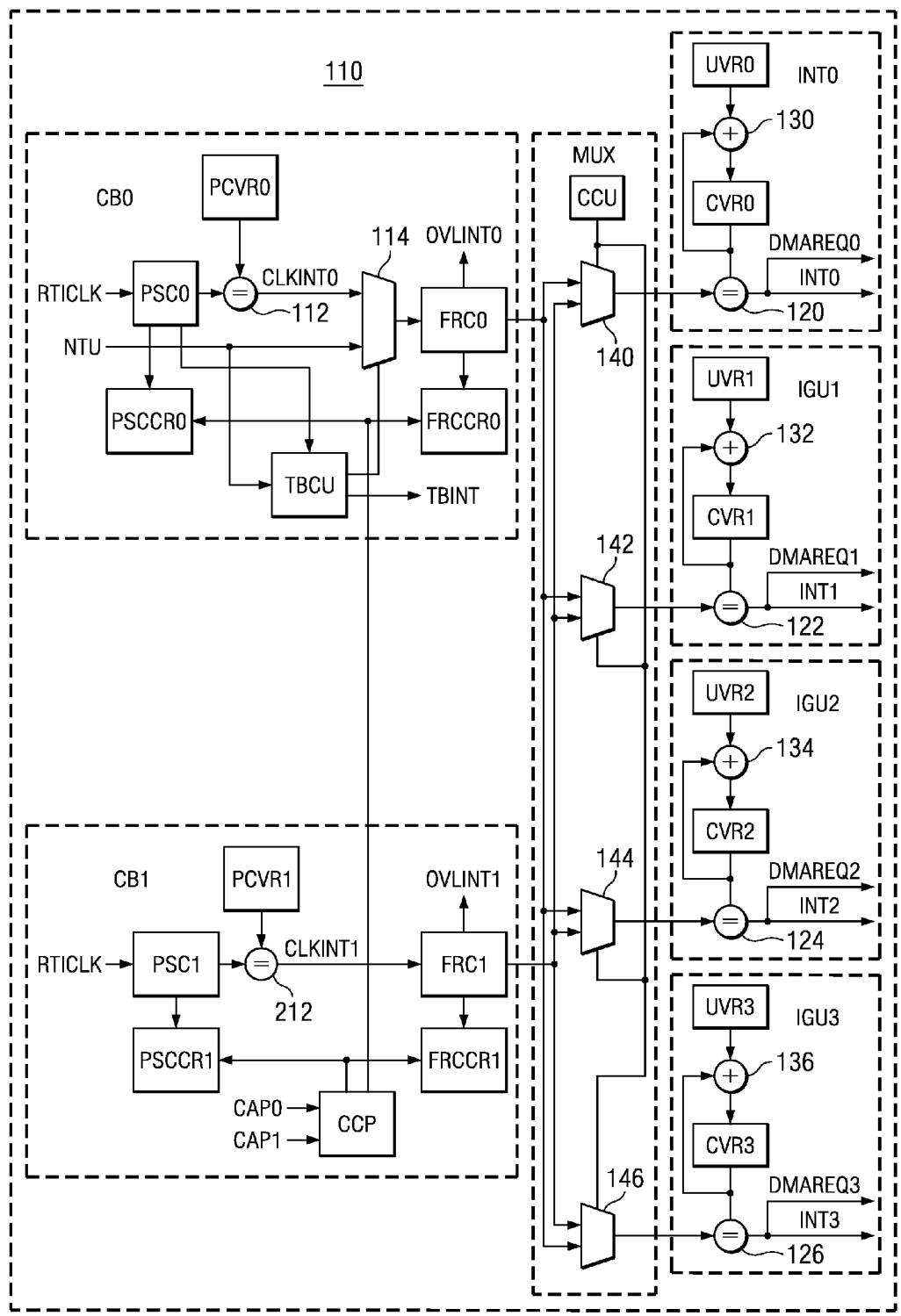
FIG. 2 shows a schematic of a dual timer module according to a second embodiment of the invention.

FIG. 2 illustrates a schematic of a dual timer module 110 for generating interrupts to a system including a microcontroller using a dedicated real-time interrupt clock signal RTICLK. The dual timer module 110 includes a first counter block CB0 and a second counter block CB1.

The first counter block CB0 includes: a first prescale counter PSC0, which is incremented by the real-time interrupt clock signal RTICLK; and a first prescale compare value register PCVR0 for storing a first configurable value PCV0. A first comparator 112 compares the current count of the first prescale counter PSC0 with the configurable count value stored in prescale configurable count register PCVR0. When the current count of the first prescale counter PSC0 matches the configurable count value PCV0, the first comparator 112 outputs a first internal clock signal CLKINT0 and resets first prescale counter PSC0 to zero.

The first counter block CB0 further includes a first free running counter FRC0 which is selectively incremented either by the first internal clock signal CLKINT0 or by an external clock signal NTU. Which of these signals will increment the first free running counter FRC0 is selected by multiplexer 114 which is controlled by a time base control unit TBCU described in detail below. When the free running counter FRC0 overflows, an interrupt is generated to a vectored interrupt manager, not shown in FIG. 2.

The second counter block CB1 comprises a second prescale counter PSC1 which is also incremented by the real-time interrupt clock signal RTICLK. A second prescale compare value register PCVR1 stores a second configurable value PCV1 which a second comparator 212 compares with the current count of the second prescale counter PSC1. The second counter block CB1 further includes a second free running counter FRC1 which is incremented by a second internal clock signal CLKINT1 from the second comparator 212 when the current count of the second prescale counter PSC1 matches the configurable value PCV1. Upon a match, the second prescale counter PSC1 is reset to zero.

Since the first prescale counter PSC0 and the second prescale counter PSC1 are separately programmable by configuring the values in the first prescale compare value register PCVR0 and in the second prescale compare value register PCVR1, respectively, the first counter block CB0 and the second counter block CB1 provide different independent time bases for the timer module 110 while using the same real-time interrupt clock signal RTICLK.

The dual timer module 110 further comprises four interrupt generation units IGU0, IGU1, IGU2 and IGU3 for providing interrupt signals INT0, INT1, INT2 and INT3 and direct memory access request signals DMAREQ0, DMAREQ1, DMAREQ2 and DMAREQ3.

Each of these interrupt generation units IGU0, IGU1, IGU2 and IGU3 includes: a compare value register CVR0, CVR1, CVR2 and CVR3 for storing a compare value; a comparator 120, 122, 124 and 126 for comparing the compare value from the respective compare value register with the current count of a selected one of the free running counters FRC0 and FRC1. Each of the interrupt generation units IGU0, IGU1, IGU2 and IGU3 further includes: an update value register UVR0, UVR1, UVR2 and UVR3 for storing an update value; and an adder 130, 132, 134 and 136 for adding the update value to the compare value stored in the compare value register CVR0, CVR1, CVR2 and CVR3, respectively.

Dual timer module 110 includes a multiplexer MUX, described in detail below, for selectively connecting the inputs of the interrupt generation units IGU0, IGU1, IGU2 and IGU3 to one of the counter blocks CB0 or CB1.

The function of the interrupt generation units IGU0, IGU1, IGU2 and IGU3 is now explained with reference to the first interrupt generation unit IGU0.

Assuming that the first free running counter FRC0 of the first counter block CB0 is connected to the first interrupt generation unit IGU0 via the multiplexer 140, the comparator 120 compares the current count of the first free running counter FRC0 with the value from the compare value register CVR0. When the current count matches the value from the compare value register CVR0, comparator 120 generates an interrupt signal INT0 and a direct memory access request signal DMAREQ0. Then, the update value stored in the update value register UVR0 is automatically updated via adder 130. Adder 130 adds the value of update value register UVR0 to the compare value in compare value register CVR0. This allows the interrupt generation unit IGU0 to provide a periodical interrupt signal INT0 without the need to calculate a new value in the compare value register CVR0 using software.

The other interrupt generation units IGU1, IGU2 and IGU3 generate the other interrupts INT1, INT2 and INT3 and the other direct memory access requests DMAREQ1, DMAREQ2 and DMAREQ3 in a similar way.

The multiplexer block MUX has four multiplexer 140, 142, 144, and 146 which are controlled by a compare control unit CCU. Each of the multiplexers 140, 142, 144 and 146 is connected to one of the interrupt generation units IGU0, IGU1, IGU2 and IGU3 and has two inputs which are connected to the free running counters FRC0 and FRC1. The multiplexers 140, 142, 144 and 146 are separately controlled so as to connect the input of the corresponding interrupt generation units IGU0, IGU1, IGU2 and IGU3 to either the first counter block CB0 or the second counter block CB1. Each of the interrupt generation units IGU0, IGU1, IGU2 and IGU3 can be connected to a different one of the first counter block CB0 and the second counter block CB1, e.g. the inputs of IGU0 and IGU3 may be connected to FRC1 and the inputs of IGU1 and IGU2 may be connected to FRC1, or the input of IGU0 may be connected to FRC1 and the inputs of IGU1, IGU2 and IGU3 may be connected to FRC1, etc.

Since each of the first counter block CB0 or the second counter block CB1 can provide a different time base, the multiplexer block MUX allows the dual timer module 110 to be easily and rapidly configured for providing four different interrupt signals INT0, INT1, INT2 and INT3 and direct memory access requests DMAREQ0, DMAREQ1, DMAREQ2 and DMAREQ3 with periods which are based on different time resolutions. Thus, the periods may cover a great variety from nanoseconds to hours within the same dual timer module using only one clock signal, i.e. RTICLK.

Figure 3:
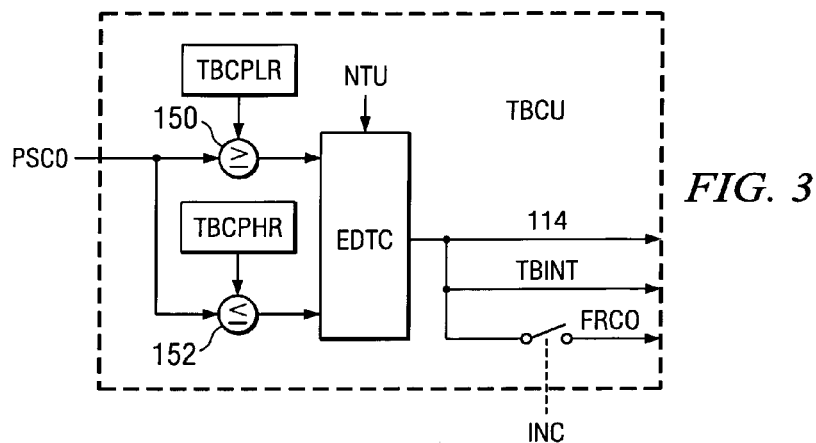
FIG. 3 shows a schematic of the time base control unit of the timer module in FIG. 1.

The first counter block CB0 has additional capabilities to simplify the operating system design and to reduce the need for CPU resources when time triggered functionality is needed. The first free running counter FRC0 can either be triggered by the first internal clock signal CLKINT0 or by an external clock source NTU derived for example from an external bus such as TTCAN or FlexRay. Software selects selection to determine which one of these sources is to be used. However, to satisfy safety requirements, it is necessary to provide a fallback solution should the internal clock source fail, for example due to a bus failure. For this purpose, the first counter block CB0 includes a time base control unit TBCU which is illustrated in detail in FIG. 3.

The time base control unit TBCU comprises a timebase low compare value register TBCPLR and a timebase high compare value register TBCPHR. The values TBCPL and TBCPH in these two 32 bit registers define the lower and upper limits of a timing window interval where an edge in the external clock signal NTU is expected. A first timebase comparator 150 compares the 32 bit current count of the first prescale counter PSC0 with the timebase low compare value TBCPL, and a second timebase comparator 152 compares the count of the first prescale counter PSC0 with the timebase high compare value TBCPH.

The time base control unit TBCU further includes an edge detector EDTC which monitors the external clock signal NTU for a rising edge. The edge detector EDTC is enabled while the value of the first prescale counter PSC0 is within the limits of the timing window. This timing window is controlled by the first and second timebase comparators 150 and 152. Edge detector EDTC is enabled when comparator 150 detects a match and disabled when comparator 152 detects a match.

Figure 4:
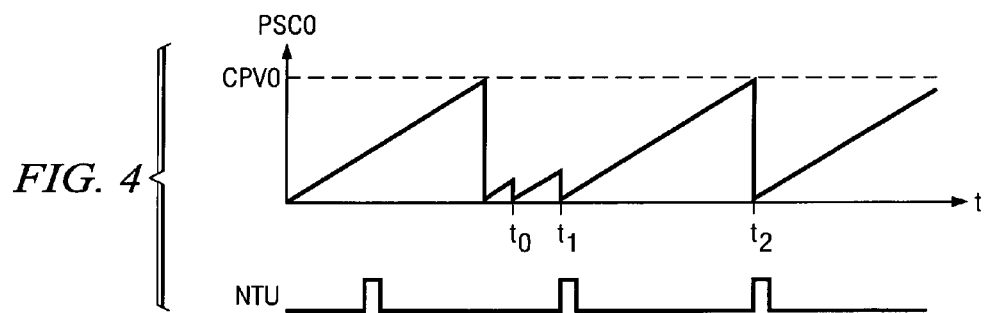
FIG. 4 shows a first timing diagram for the count from the prescale counter of the timer module in FIG. 1 in reference to an external clock signal.

FIG. 4 shows a timing diagram for the count of the first prescale counter PSC0 and the external clock signal NTU. FIG. 4 helps describe the function of the timebase control unit TBCU when switching from internal to external timebase.

At $t=t_0$ an application decides to switch the trigger source for the first free running counter FRC0 from internal to external by software. With this selection the multiplexer 114 is switched from the first internal clock signal CLKINT0 coming from the first comparator 112 to the external clock signal NTU and the first prescale counter PSC0 is reset to zero. Now, the edge detector EDTC will be active for an initial synchronisation interval, which is one period of the internal clock signal CLKINT0 plus the value of the timebase high compare value TBCPH, or until an edge in the external clock signal NTU is detected. This is to synchronize the phase of the internal and the external clock signals. Remember that the period of the internal clock signal CLKINT0 from the comparator 112 is defined by the first configurable value PCV0 in the first prescale compare value register PCVR0.

Since an edge of the external clock signal NTU occurs within the initial synchronisation interval at $t=t_1$, the first prescale counter PSC0 is reset to zero again and the free running counter FRC0 is incremented. When the next edge in the external clock signal NTU occurs at $t=t_2$, once again the first prescale counter PSC0 is reset to zero and the free running counter FRC0 is incremented. However, to synchronize the periods of the internal clock signal CLKINT0 and the external clock signal NTU the first configurable value PCV0 has to be adapted by software in order to change the period of the internal clock signal CLKINT0.

Figure 5:
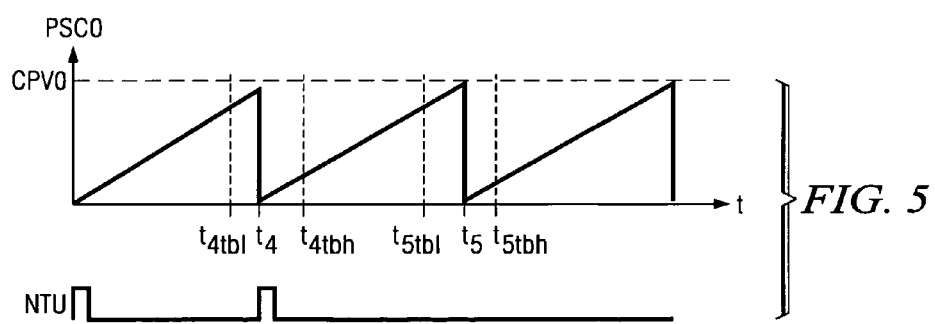
FIG. 5 shows a second timing diagram for the count from the prescale counter of the timer module in FIG. 1 in reference to an external clock signal.

FIG. 5 illustrates the function of the timebase control unit TBCU when the external clock signal NTU fails.

At $t=t_4$, an edge in the external clock signal NTU occurs within the timing window defined by the timebase low compare value TBCPL and the timebase high compare value TBCPH. These times are marked $t_{4tbl}$ and $t_{4tbh}$, respectively.

At $t=t_{5tbl}$, the edge detector EDTC is enabled once again for monitoring the external clock signal NTU. At $t=t_5$, the count of the prescale counter PSC0 reaches the first configurable value PCV0 which represents the period of the internal clock signal CLKINT0. Since the multiplexer is still switched to "external," the first prescale counter PSC0 is reset to zero, but the first free running counter FRC0 is not incremented. However, the edge detector EDTC continues monitoring the external clock signal NTU up to the end of the timing window at $t=t_{5tbh}$, when the first prescale counter PSC0 reaches the timebase high compare value TBCPH. Note that the timebase high compare value TBCPH is lower than the first configurable value PCV0, or else the first prescale counter PSC0 would not be able to ever reach this value. This is because the first prescale counter PSC0 is reset to zero when it reaches the first prescale compare value PCVR0 to avoid jitter.

Since no edge in the external clock signal NTU has been detected before $t=t_{5tbh}$, the edge detector EDTC switches the multiplexer 114 to select the internal clock signal CLKINT0. Optionally, an interrupt TBINT can be generated and the first free running counter FRC0 can be incremented to compensate for the missing clock cycle of the external clock signal NTU, if this is configured via a register.

In order to provide time stamp functionality, the prescale counters PSC0 and PSC1 and the free running counters FRC0 and FRC1 are associated with capture registers PSCCR0, PSCCR1, FRCCR0 and FRCCR1 which capture the respective current counts in response to an external event. These capture registers PSCCR0, PSCCR1, FRCCR0 and FRCCR1 are controlled by a capture control unit CCP.

The capture control unit CCP can be configured detect external events CAP0 and CAP1 to trigger the capture of the counter values from the first counter block CB0 or from the second counter block CB1 or from both of them. An interrupt manager (not shown) generates these capture events CAP0 and CAP1 for the capture control unit CCP when a peripheral module generates an interrupt. The interrupt manager is also configured to determine which peripherals are allowed to generate capture events.

When a capture event CAP0, e.g. for the first counter block CB0, is received, the capture control unit CCP causes the value of the prescale counter PSC0 to be stored in the first prescale counter capture register PSCCR0 and the value of the first free running counter FRC0 to be stored in the first free running counter capture register FRCCR0. The capture registers must be read in this order: first the free running capture count register FRCCR0; and then the prescale counter capture register PSCCR0.

Since the counters PSC0, FRC0, PSC1 and FRC1 are up counters, a time stamp can easily be obtained by concatenating the values from the capture registers without having to do software calculation as down counters would require. The time stamp functionality provided by the capture registers may be used for example to benchmark certain areas of code by reading the counter contents at the beginning and the end of a desired code range and calculating the difference between the values.

What is claimed is:

1. A timer module for generating interrupts to a system using a dedicated real-time interrupt clock signal, comprising:
   a prescale counter receiving the real-time interrupt clock and incremented by the real-time interrupt clock signal;
   a prescale compare value register storing a configurable value;
   a comparator connected to said prescale counter and said prescale compare value register for comparing the current count of the prescale counter with the stored configurable value and generating a match signal upon detection of a match;
   a free running counter connected to said comparator and incremented by said match signal from the comparator; and
   a plurality of interrupt generation units, each interrupt generation unit including
      an input receiving the current count of the free running counter,
      a compare value register for storing a compare value,
      an interrupt generator comparator connected to said input receiving the current count of the free running counter and the compare value register for comparing the compare value from the respective compare value register with the current count of the free running counter and generating an interrupt signal when the current count matches the compare value;
      an update value register storing an update value, and
      an adder for adding the update value to the compare value after each match detected by said interrupt generator comparator.

2. The timer module of claim 1, further comprising:
   a first capture register connected to said prescale counter capturing and storing the count of said prescale counter in response to an external event; and
   a second capture register connected to said free running counter capturing and storing the count of said free running counter in response to said external event.

3. The timer module of claim 2, wherein:
   said prescale counter is an up counter.

4. A timer module for generating interrupts to a system using a dedicated real-time interrupt clock signal, comprising:
   a prescale counter receiving the real-time interrupt clock and incremented by the real-time interrupt clock signal;

a prescale compare value register storing a configurable value;
a comparator connected to said prescale counter and said prescale compare value register for comparing the current count of the prescale counter with the stored configurable value and generating a match signal upon detection of a match;
a free running counter connected to said comparator and incremented by said match signal from the comparator; and
a plurality of interrupt generation units, each interrupt generation unit including
    an input receiving the current count of the free running counter,
    a compare value register for storing a compare value,
    an interrupt generator comparator connected to said input receiving the current count of the free running counter and the compare value register for comparing the compare value from the respective compare value register with the current count of the free running counter and generating an interrupt signal when the current count matches the compare value; and
a multiplexer having a first input receiving the real-time interrupt clock a second input receiving an external clock, an output connected to said free running counter and a control input receiving a control signal for coupling a selected one of the real-time interrupt clock and said external clock to said free running counter dependent upon said control signal.

5. The timer module of claim 4, further comprising:
a time base control unit receiving said external clock and having an output supplying said control signal to said control input of said multiplexer, said time base control unit generating a control signal causing said multiplexer to select the real-time interrupt clock upon failure of said the external clock.

6. The timer module of claim 5, wherein:
said time base control unit is further connected to said prescale counter, said time base control unit detects failure of said external clock when the value of said prescale counter leaves a predetermined timing window before detection of said external clock.

7. The timer module of claim 6, wherein:
said time base control unit further includes
    a timebase low compare value register storing in a lower limit compare value,
    a greater than comparator receiving said prescale count of said prescale counter and said lower limit compare value of said timebase low compare value register and generating a first enable signal indicating when said prescale count is greater than said lower limit compare value,
    a timebase high compare value register storing an upper limit comprare value,
    a less than comparator receiving said prescale count of said prescale counter and said upper limit compare value of said timebase high compare value register and generating a second enable signal indicating when said prescale count is less than said upper limit compare value, and
    an edge detector receiving said external clock, said first enable signal and said second enable signal and generating said control signal to said multiplexer to select the real-time interrupt clock if a pulse of said external clock is not detected when said first enable signal indicates said prescale count is greater than said lower limit compare value and said second enable signal indicates said prescale count is less than said upper limit compare value.

8. The timer of claim 7, wherein;
said upper limit is lower than said prescale configurable value stored in said prescale compare value register.

9. A timer module for generating interrupts to a system using a dedicated real-time interrupt clock signal, comprising:
a plurality of counter block, each counter block including
    a prescale counter receiving the real-time interrupt clock and incremented by the real-time interrupt clock signal;
    a prescale compare value register storing a configurable value;
    a comparator connected to said prescale counter and said prescale compare value register for comparing the current count of the prescale counter with the stored configurable value and generating a match signal upon detection of a match;
    a free running counter connected to said comparator and incremented by said match signal from the comparator;
a multiplexer block including a plurality of multiplexers equal in number to said interrupt generation units, each multiplexer having a plurality of inputs receiving said free running count of a free running counter of a corresponding counter block, a control input and an output, each multiplexer coupling said free running count received at a selected input to said output dependent upon said control signal;
a plurality of interrupt generation units, each interrupt generation unit including
    an input receiving the output of a corresponding one of said multiplexers of said multiplexer block,
    a compare value register for storing a compare value,
    an interrupt generator comparator connected to said input receiving the current count of said free running counter selected by said corresponding multiplexer and the compare value register for comparing the compare value from the respective compare value register with the current count of the free running counter and generating an interrupt signal when the current count matches the compare value.

10. The timer module of claim 9, wherein:
each of said interrupt generation units further comprises:
    an update value register storing an update value, and
    an adder for adding the update value to the compare value after each match detected by said interrupt generator comparator.

11. The timer module of claim 9, wherein:
each counter block further includes
    a first capture register connected to said prescale counter capturing and storing the count of said prescale counter in response to an external event, and
    a second capture register connected to said free running counter capturing and storing the count of said free running counter in response to said external event.

12. The timer module of claim 11, wherein:
said prescale counter of each counter block is an up counter.

13. The timer module according to claim 9, wherein:
each counter block further includes
    a counter block multiplexer having a first input receiving the real-time interrupt clock a second input receiving an external clock, an output connected to said free running counter and a control input receiving a control signal for coupling a selected one of the real-time interrupt clock and said external clock to said free running counter dependent upon said control signal.

14. The timer module of claim 13, wherein:
each counter block further includes
a time base control unit receiving said external clock and having an output supplying said control signal to said control input of said multiplexer, said time base control unit generating a control signal causing said multiplexer to select the real-time interrupt clock upon failure of said the external clock.

15. The timer module of claim 14, wherein:
said time base control unit of each counter block is further connected to said prescale counter, said time base control unit detects failure of said external clock when the value of said prescale counter leaves a predetermined timing window before detection of said external clock.

16. The timer module of claim 15, wherein:
said time base control unit of each counter block further includes
a timebase low compare value register storing in a lower limit compare value,
a greater than comparator receiving said prescale count of said prescale counter and said lower limit compare value of said timebase low compare value register and generating a first enable signal indicating when said prescale count is greater than said lower limit compare value,
a timebase high compare value register storing an upper limit comprare value,
a less than comparator receiving said prescale count of said prescale counter and said upper limit compare value of said timebase high compare value register and generating a second enable signal indicating when said prescale count is less than said upper limit compare value, and
an edge detector receiving said external clock, said first enable signal and said second enable signal and generating said control signal to said multiplexer to select the real-time interrupt clock if a pulse of said external clock is not detected when said first enable signal indicates said prescale count is greater than said lower limit compare value and said second enable signal indicates said prescale count is less than said upper limit compare value.

17. The timer of claim 16, wherein;
said upper limit is lower than said prescale configurable value stored in said prescale compare value register.

* * * * *